United States Patent [19]

Jain

[11] Patent Number: 4,881,231

[45] Date of Patent: Nov. 14, 1989

[54] FREQUENCY-STABILIZED LINE-NARROWED EXCIMER LASER SOURCE SYSTEM FOR HIGH RESOLUTION LITHOGRAPHY

[76] Inventor: Kantilal Jain, 18 Algonquian Trail, Briarcliff Manor, N.Y. 10510

[21] Appl. No.: 277,028

[22] Filed: Nov. 28, 1988

[51] Int. Cl.[4] ............................................. H01S 3/13
[52] U.S. Cl. ........................................ 372/32; 372/57; 372/18
[58] Field of Search .................... 372/29, 32, 57, 18; 356/349

[56] References Cited

U.S. PATENT DOCUMENTS

| | | | |
|---|---|---|---|
| 4,221,472 | 9/1980 | Smith et al. | 372/21 |
| 4,594,003 | 6/1986 | Sommargren | 356/349 |

*Primary Examiner*—Leon Scott, Jr.
*Attorney, Agent, or Firm*—Carl Kling

[57] ABSTRACT

An excimer laser source system that produce radiation characterized by a wavelength with a high degree of stability and by a narrow spectral bandwidth is described. Such an excimer laser system is suitable as a source in high-resolution high-throughput lithography. Key features of the disclosed system are: frequency-locking of the excimer laser center wavelength to the cavity spacing of a highly stable external Fabry-Perot or other resonator; stabilization of the external resonator by referencing its cavity spacing to a frequency-locked reference laser; stabilization of the reference laser by locking its frequency to a fundamental atomic or molecular transistion; and provision of an intra-cavity or other Fabry-Perot resonator in the excimer laser optical cavity to both narrow the spectral bandwidth of the laser and to select its center wavelength. The advantage of the invention is its ability to transfer with precision the high degree of stability of the reference laser wavelength to the excimer laser wavelength, thereby giving the excimer laser wavelength precision and stability available only with fundamental atomic and molecular transistions.

22 Claims, 1 Drawing Sheet

FREQUENCY-STABILIZED LINE-NARROWED EXCIMER LASER SOURCE SYSTEM FOR HIGH RESOLUTION LITHOGRAPHY

BACKGROUND OF THE INVENTION

1. Field of the Invention

This invention relates to excimer laser source systems, and more particularly relates to excimer laser source systems having output radiation that is stabilized in its center frequency, narrowed in its wavelength spread, and suitable for high resolution projection lithography systems.

2. Description of the Prior Art

Lithography systems are extensively used in the production of integrated circuit chips and electronic circuit boards. Such systems typically include a primary light source such as a high intensity lamp or a laser, mask and substrate positioning systems, a projection system to illuminate and image the pattern present on the mask onto the substrate, and a control system. The intent typically is to illuminate a wafer coated with a layer of a photosensitive material so as to produce the desired circuit pattern, which later will be metallized or otherwise activated during further processing. Illumination may be ultraviolet light or visible light or other radiation. The desire is to illuminate the target regions selectively so as to activate a particular pattern. Integrated circuit chips typically undergo numerous illumination steps and physical treatment steps during production.

As the demand for chips with ever greater memory and processing capability increases, the individual bits on the chips get smaller in dimensions. This requires that the lithography equipment used for imaging these patterns have higher and higher resolution. Simultaneously, the larger physical size of the chips demands that the higher resolution be achieved over a larger image field. The requirement of higher resolution has led to the use of shorter wavelengths and projection lenses of higher numerical apertures. The demand for larger image field sizes has resulted in designs of projection lenses of increasing complexity.

The move towards lithography using radiation of shorter wavelengths has progressed from conventional ultraviolet (UV) wavelengths (435 nm region) to mid-UV wavelengths (365 nm region) to deep UV wavelengths (250 nm region). Among deep UV sources for lithography, excimer lasers have been found to be the most attractive due to their high power output as well as desirable spatial and spectral characteristics. Lithography in the deep UV also requires that suitable optical materials be available for fabrication of the projection lenses. The design of a high-resolution projection lens assembly requires the use of different optical materials with different refractive indices in order to achieve the required resolution over the desired image field size. In the conventional UV and mid-UV regions, the lens designer may choose from a number of available glasses of different refractive indices. However, the choice of suitable optical lens materials in the 250 nm region is severely limited. Only fused quartz possesses the optical and mechanical properties required of a material to qualify it as suitable for fabrication of projection lens elements for deep UV lithography. With only one optical material to work with, the designer of a deep UV projection lens must therefore be constrained to use a radiation source of very narrow bandwidth —on the order of a few thousandths of a nm —in order to achieve distortion-free imaging over a suitable field size. Along with the narrow bandwidth, a high degree of stability of the center wavelength of the laser also becomes an important requirement. Typical mercury arc lamps, with linewidths of several nm, and conventional excimer lasers, with linewidths of several tenths of a nm, are both unsuitable for use with deep UV all-quartz projection lenses. These limitations have led to the development of various techniques for narrowing the spectral bandwidth of an excimer laser.

An approach used in the prior art is to employ a parallel-plate etalon placed inside the optical cavity of the excimer laser. The etalon acts as a frequencyselective element by providing high transmission over only a narrow wavelength band and introducing sufficient loss at other wavelengths; this forces the laser to lase over the narrow transmission band of the etalon. A variation of the above approach uses two intra-cavity etalons. In another variation —a further improvement of the above approach —a third etalon is placed outside the laser cavity to monitor the laser wavelength and control the two intra-cavity etalons. The three-etalon method enables one to obtain with an excimer laser a spectral bandwidth of 0.006 nm (±0.003 nm) and a wavelength stability of ±0.001 nm. Other approaches in the prior art have used prisms and diffraction gratings, instead of etalons, as the frequency-selective elements nn the laser cavity. However, since the basic technique in these methods has been to use intra-cavity frequency-tuning optical components, the results have been similar to the etalon method.

SUMMARY OF THE INVENTION

The object of the invention is to provide an excimer laser source system, that produces radiation of a narrow spectral bandwidth as well as a center wavelength with a high degree of stability, for use as a source of high-resolution, high-throughput lithography.

A feature of the invention is the provision of frequency-locking of the excimer laser center wavelength to the cavity spacing of a highly stable external Fabry-Perot or other resonator.

Another feature of the invention is the provision of stabilization of the external resonator by referencing its cavity spacing to a frequency-locked reference laser.

Another feature of the invention is the provision of stabilization of the reference laser by locking its frequency to a fundamental atomic or molecular transition.

Still another feature of the invention is the provision of an intra-cavity Fabry-Perot or other resonator in the excimer laser optical cavity to both narrow the spectral bandwidth of the laser and to select its center wavelength.

The advantage of the invention is its ability to transfer with precision the high degree of stability of the reference laser wavelength to the excimer laser wavelength, thereby giving the excimer laser wavelength precision and stability available only with fundamental atomic and molecular transitions.

Other objects, features and advantages of the invention will be apparent to those skilled in the art by understanding the description of the preferred embodiments as explained in the following text and as illustrated in the accompanying drawings.

DESCRIPTION OF THE PREFERRED EMBODIMENT

This invention makes it possible to produce a high average-power excimer laser source system which has its spectral output confined in a very narrow bandwidth and also has a high degree of wavelength stability obtained by referencing the excimer laser wavelength to a fundamental molecular absorption line through the use of three different opto-mechanical stabilization loops.

Figure 1:
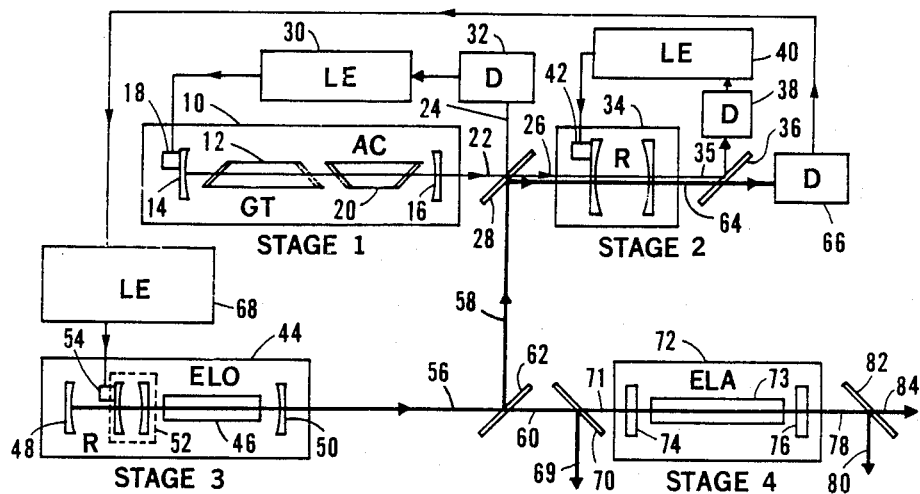
FIG. 1 is a composite illustration of a frequency-stabilized and line-narrowed excimer laser source system, showing a reference laser frequency-stabilized by a molecular absorption cell, an external resonator locked to the reference laser, an excimer laser oscillator containing an intra-cavity resonator and stabilized by the external resonator, and an excimer laser amplifier injection-locked by the excimer laser oscillator.

FIG. 1 depicts the essential components of the preferred embodiment. The first stage of the system is a frequency-stabilized helium-neon laser source 10, which consists of helium-neon gain tube 12, optical cavity mirrors 14 and 16, piezoelectric transducer 18, and intra-cavity absorption cell 20 containing molecular iodine. The output beam 22 of laser source 10 is split into two beams —a partially reflected beam 24 and a largely transmitted beam 26 —by dielectric beamsplitter 28. The iodine vapor in the absorption cell 20 has a saturable absorption line that overlaps in wavelength with the helium-neon laser transition at 632.8 nm. The insertion of the cell 20 within the laser cavity as defined by mirrors 14 and 16 causes the laser gain to be concentrated at the wavelength of the saturated molecular transition of iodine; hence the spectrum of the output beam 22 has its intensity peak at this wavelength. The laser output is prevented from drifting away from this optimum wavelength by locking electronics 30 by detecting the partially reflected beam with detector 32 and using this signal to drive the piezoelectric transducer 18 which optimizes the laser cavity spacing between mirrors 14 and 16 so as to maximize the power in the output beam 22. Thus, the first locking loop, consisting of laser 10, beamsplitter 28, detector 32 and locking electronics 30, produces a frequency-stabilized laser beam 26 at the helium-neon wavelength of 632.8 nm.

Beam 26 now enters the second stage of the system. The object of the second stage is to produce a Fabry-Perot or other resonator with cavity spacing that is precisely locked to the reference wavelength, i.e. the wavelength of beam 26. The second locking loop consists of resonator 34, dielectric beamsplitter 36, detector 38 and locking electronics 40. The resonator is tuned to the wavelength of beam 26 such that at optimum tuning its transmission is maximum at the reference wavelength. Beam 35 exiting from resonator 34 is detected by detector 38 and the signal from detector 38 is used by locking electronics 40 to drive piezoelectric transducer 42 in such a way that if the intensity of beam 35 deviates from its optimum value, the cavity spacing of resonator 34 is fine-tuned to re-maximize the detector signal. Thus, the first two stages together produce a resonator the cavity spacing of which is stabilized by referencing it to a molecular transition.

The high degree of stability of resonator 34 is next transferred to excimer laser oscillator 44 in the third stage. The excimer laser oscillator 44 consists of excimer discharge chamber 46, laser cavity mirrors 48 and 50, intra-cavity Fabry-Perot or other resonator 52 for spectral bandwidth narrowing and frequency tuning, and piezoelectric transducer 54. The output beam 56 from laser 44 is split into two beams —a partially reflected beam 58 and a largely transmitted beam 60 —by dielectric beamsplitter 62. Beam 58 is reflected by beamsplitter 28 into resonator 34; beamsplitter 28 is thus a dichroic beamsplitter: it is partially reflective at helium-neon laser wavelength and highly reflective at excimer laser wavelength. Excimer laser beam 64 exiting from resonator 34 is transmitted by beamsplitter 36 and detected by detector 66; beamsplitter 36 is also thus a dichroic beamsplitter: it is highly reflective at helium-neon laser wavelength and highly transmissive at excimer laser wavelength. The signal from detector 66 is used by locking electronics 68 to drive piezoelectric transducer 54 to fine-tune the spacing of intra-cavity resonator 52, and therefore the wavelength of excimer laser oscillator 44, in such a way that the transmission of beam 58 through resonator 34 is maximized. In this way, the third locking loop, consisting of excimer laser oscillator 44, beamsplitters 62 and 28, resonator 34, beamsplitter 36, detector 66 and locking electronics 68, gives the same relative stability in wavelength to excimer laser oscillator 44 as the relative stability achieved in cavity spacing for resonator 34. Since resonator 34 was stabilized in the second stage by reference laser 10, which in turn was locked to an absorption line of iodine in the first stage, the wavelength of excimer laser oscillator 44 has the high degree of stability made possible by referencing it to a fundamental molecular transition. Wavelength stability thus obtained can readily be on the order of 1 part in $10^8$ or better; thus, for a KrF (krypton fluoride) excimer laser operating at a wavelength of 248.4 nm, this invention makes it possible to produce a wavelength stability on the order of ±0.000001 nm.

The average power produced in the frequency-stabilized and line-narrowed beam 60 from excimer laser oscillator 44 is now amplified by an excimer laser amplifier. A portion of beam 60 is first split off as beam 69 by beamsplitter 70 for use in auxiliary subsystems, such as an alignment subsystem, within the lithography system. The transmitted beam 71 enters the excimer laser amplifier 72 which consists of excimer discharge gain chamber 73, and optical windows 74 and 76. Beam 71 passes through amplifier 72 only once, and becomes amplified through gain due to stimulated emission in the excimer discharge gain chamber 73. The gain occurs at the wavelength of beam 71; thus, the output beam 78 from amplifier 72 possesses, like excimer laser oscillator beam 56, a high degree of frequency stability and a spectrally narrow bandwidth. After a small portion of beam 78 is separated as beam 80 by beamsplitter 82 for purposes such as power monitoring and pulse counting, the largely transmitted beam 84 is used as the final output beam for exposure of the substrate in the lithography system.

Figure 2:
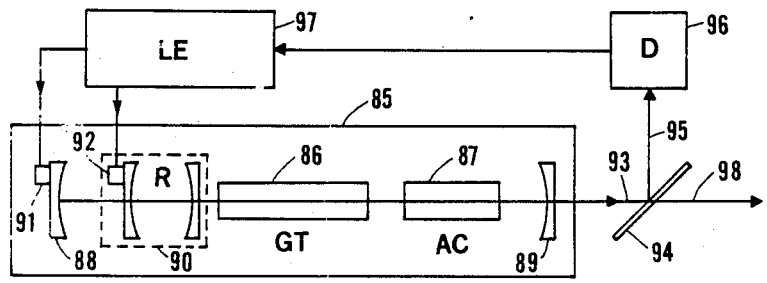
FIG. 2 is an illustration of an excimer laser frequency-stabilized by an intra-cavity atomic vapor cell.

In an alternate embodiment of the invention, the amplification stage (Stage 4) consisting of excimer laser amplifier 72 may be omitted. This embodiment will be suitable in those applications where the average power available from the excimer laser oscillator beam 60 is sufficient. In yet another embodiment of the invention the excimer laser is configured with an optical cavity and a Fabry-Perot or other resonator, and an intra-cavity saturable absorption cell is used to directly lock the excimer laser wavelength to a suitable atomic or molecular transition. Referring to FIG. 2, the composite excimer laser system 85 consists of excimer discharge chamber 86, intra-cavity absorption cell 87, excimer laser cavity mirrors 88 and 89, resonator 90, and piezoelectric transducers 91 and 92. Without absorption cell 87 and resonator 90, the excimer laser would lase with a free-running spectral bandwidth determined by the cavity mirrors 88 and 89. Absorption cell 87, which contains vapor of a suitable atomic or molecular species with a saturable absorption line that lies within the free-running excimer laser bandwidth, causes the gain in the discharge chamber to concentrate at the wavelength of the said absorption line, thus stabilizing the excimer laser frequency with the precision of a fundamental atomic or molecular transition. For the case of KrF excimer laser operating at a wavelength of 248.4 nm, two atomic vapors with absorption lines in the vicinity of 248.4 nm are mercury (at 248.382 nm) and phosphorus (at 248.415 nm). A portion of beam 93 exiting from laser 85 is split off by beamsplitter 94 as beam 95, the rest being transmitted as the final output beam 98. Beam 95 is detected by detector 96 the signal from which is used by locking electronics 97 to drive piezoelectric transducers 91 and 92 so as to optimize the cavity spacings of, respectively, the excimer laser cavity (defined by mirrors 88 and 89) and the resonator 90, such that the power in beam 93 is maximized. Thus the tuning of the resonator 90 and the cavity mirrors 88 and 89 is kept continuously optimized, resulting in a spectrally narrowed and frequency-stabilized excimer laser output.

Figure 3:
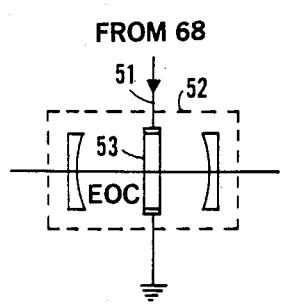
FIG. 3 is an illustration of a resonator tuned by a feedback signal that adjusts the refractive index of an electro-optic crystal placed within the resonator cavity.
Figure 4:
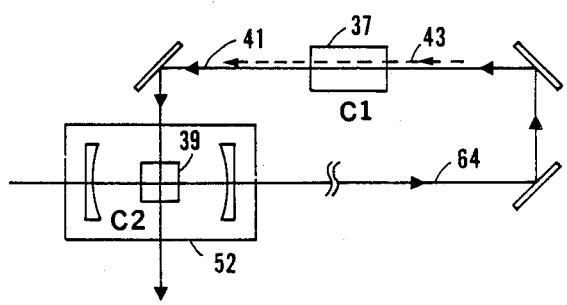
FIG. 4 is an illustration of an all-optical feedback loop to adjust the effective optical path-length of a resonator, showing an optical crystal C1 that monitors the output of the resonator and provides a feedback control signal to a second optical crystal C2 placed within the cavity of the resonator.

In other alternative embodiments, locking mechanisms different from those shown in FIGS. 1 and 2 may be used. For example, referring to the excimer laser oscillator (44, Stage 3) in FIG. 1 and to FIG. 3, the cavity spacing of resonator 52 may be adjusted optically (instead of mechanically as done by the piezoelectric transducer 54) by having between the mirrors of resonator 52 an electro-optic crystal (53, FIG. 3) which receives a voltage signal (51, FIG. 3) from locking electronics 68 so as to alter the refractive index of the electro-optic crystal 53 and thus alter the effective optical path-length of the cavity spacing of resonator 52 in such a way that the transmission of beam 58 through resonator 34 of Stage 2 is maximized. Similarly, the effective optical path-lengths of the reference laser cavity spacing (defined by mirrors 14 and 16, Stage 1) and the cavity spacing of resonator 34 (Stage 2) may be locked to their optimum values by intra-cavity electro-optic crystals (instead of piezoelectric transducers 18 and 42) which receive voltage signals from their respective locking electronics 30 and 40. In a similar alternative to the embodiment of FIG. 2, the effective optical path-lengths of the excimer laser cavity spacing (defined by mirrors 88 and 89) and the cavity spacing of resonator 90 may be locked to their optimum values by intra-cavity electro-optic crystals (instead of piezoelectric transducers 91 and 92) which receive voltage signals from locking electronics 97. In a further variation of the above embodiments, one or more of the locking feedback loops may be entirely optical. As an example, referring again to the excimer laser oscillator (44, Stage 3) in FIG. 1 and to FIG. 4, the locking feedback loop that includes detector 66, locking electronics 68 and piezoelectric transducer 54 may be replaced by an all-optical loop comprising two crystals (37, 39 in FIG. 4) such that the first crystal 37 receives beam 64 exiting from resonator 34 and converts it into a suitable optical signal 41 which enters the second crystal 39 (which is placed within the cavity of resonator 52) and alters its refractive index so as to optimize the effective optical path-length of the cavity spacing of resonator 52. In such an all-optical loop the first crystal 37 may be, for example, a nonlinear optical medium in which an output beam of a wavelength different from the wavelength of the input beam is generated by means such as frequency conversion with or without an auxiliary beam 43.

What is claimed is:

1. An excimer laser source system emitting radiation characterized by a wavelength with a high degree of stability and by a narrow spectral bandwidth, and comprising:
   (a) a frequency-stabilized reference laser system of a wavelength different from the wavelength of said excimer laser source system;
   (b) a resonator system (34-42,) stabilized by locking its cavity spacing to the wavelength of said reference laser system and comprising: a resonator (34) through which beam (26) from said reference laser system is transmitted; a detector (38) that measures the power in the reference laser beam (35) transmitted through said resonator (34); a piezoelectric transducer (42) that tunes said resonator (34); and a locking electronics system (40) that receives input from said detector (38) and drives said piezoelectric transducer (42) in such a way that the power in said transmitted reference laser beam (35) is maximized so as to keep the cavity spacing of said resonator (34) locked to the reference laser wavelength; and
   (c) an excimer laser oscillator (44,), another detector (66) and another locking electronics system (68); said excimer laser oscillator (44) comprising a laser gain medium (46), laser cavity mirrors (48, 50), an intra-cavity resonator (52) and another piezoelectric transducer (54); and the output beam (56) from said excimer laser oscillator (44) being spectrally narrowed and frequency-stabilized by measuring its intensity with said detector (66) after transmitting it through said first resonator (34,), and inputting the signal from said detector (66) into said locking electronics system (68) to drive said piezoelectric transducer (54) and fine-tune said intra-cavity resonator (52) in such a way that the transmission of said excimer laser oscillator beam (56) through said first resonator (34,) is maximized.

2. A frequency-stabilized and line-narrowed excimer laser source system according to claim 1, wherein said reference laser system is frequency-stabilized by locking its wavelength to an absorption line in a vapor.

3. A frequency-stabilized and line-narrowed excimer laser source system according to claim 2, wherein said reference laser system comprises: a laser gain medium (12,); an intra-cavity absorption cell (20) containing a vapor with an absorption line overlapping with the wavelength of said reference laser; a laser optical cavity (14, 16); a detector (32) that measures the output power of said reference laser; a piezoelectric transducer (18) that tunes said optical cavity; and a locking electronics system (30) that receives input from said detector (32) and drives said piezoelectric transducer (18) in such a way that said optical cavity (14, 16) is kept optimally tuned to maximize the output power of said reference laser so as to keep the reference laser wavelength locked to said absorption line.

4. A frequency-stabilized and line-narrowed excimer laser source system according to claim 1, further including an excimer laser amplifier, the power in the frequency-stabilized and line-narrowed output beam (60) from said excimer laser oscillator being amplified by passing it through said excimer laser amplifier.

5. An excimer laser source system (85-98) emitting radiation characterized by a wavelength with a high degree of stability and by a narrow spectral bandwidth, and comprising: an excimer laser gain medium (86); an intra-cavity absorption cell (87) containing vapor of a material with an absorption line overlapping with the wavelength of said excimer laser; a laser optical cavity (88, 89); a detector (96) that measures the output power of said excimer laser; an intra-cavity resonator (90); piezoelectric transducers (91, 92) that tune said laser optical cavity (88, 89) and said resonator (90); and a locking electronics system (97) that receives input from said detector (96) and drives said piezoelectric transducers (91, 92) in such ways that said laser optical cavity (88, 89) and said resonator (90) are kept optimally tuned to maximize the output power of said excimer laser so as to keep the excimer laser wavelength locked to said absorption line.

6. A frequency-stabilized and line-narrowed excimer laser source system according to claim 5, wherein the vapor material in said intra-cavity absorption cell is mercury.

7. A frequency-stabilized and line-narrowed excimer laser source system according to claim 5, wherein the vapor material in said intra-cavity absorption cell is phosphorus.

8. An excimer laser source system emitting radiation of highly stable wavelength and of narrow spectral bandwidth, comprising:
(a) a laser optical cavity (48, 50 // 88, 89);
(b) an excimer laser gain medium (46 // 86) operatively interposed within said laser optical cavity (a) so as to provide an excimer laser beam with a finite spectral bandwidth;
(c) an absorption cell (20 // 87) arranged to pass a radiation beam within a subset of said finite spectral bandwidth according to a fundamental physical property, and provide a narrow bandwidth output beam (22 // 93) at a reference wavelength:
(d) output means (62 // 94) for forwarding a feedback control beam (58 // 95) and an output beam (60 // 98), both at said reference wavelength;
(e) control signal feedback means (28, 34, 66, 68 // 96, 97); and
(f) resonator means (52 // 90) responsive to said control signal feedback means to transfer with precision the stability at said reference wavelength of the fundamental physical property to said laser optical cavity.

9. An excimer laser source system according to claim 8, in which said absorption cell (87) is juxtaposed in series with said excimer laser gain medium (86) operatively interposed within said laser optical cavity (88, 89).

10. An excimer laser source system according to claim 9, comprising in addition feedback means (91) responsive to said control signal feedback means to optimize output power of said laser optical cavity at said reference wavelength.

11. An excimer laser source system according to claim 8, in which said absorption cell (20) is external to said laser optical cavity (48, 50), comprising three stages (Stage 1, Stage 2, Stage 3), wherein:
Stage 1 comprises laser means (10) with said absorption cell (20) included and with feedback to lock said laser means to a reference frequency;
Stage 2 comprises resonator means (34) with feedback to lock said resonator means to said reference frequency; and
Stage 3 comprises excimer laser means (44) including resonator means (52) operatively associated with said Stage 2 reference frequency and with feedback to lock said excimer laser means with respect to said reference frequency.

12. An excimer laser source system according to claim 8, in which said resonator means is dynamically adjusted by an optical response effected by said control signal feedback means to transfer with precision the stability at said reference wavelength of the fundamental physical property to said laser optical cavity.

13. An excimer laser source system according to claim 12, in which said resonaor means (f) includes between its mirrors an electro-optic crystal (53,) whose refractive index is responsive to said control signal feedback, means to dynamically adjust said resonator means to transfer with precision the stability at said reference wavelength of the fundamental physical property to said laser optical cavity.

14. An excimer laser source system according to claim 12, in which said control signal feedback means comprises a first optical medium (37,) and said resonator means includes between its mirfors a second optical medium (39), said first optical medium (37) receiving a feedback control beam (64) and. producing an optical signal (41) that enters said second optical medium (39) whose optical properties are responsive to said optical signal (41) to dynamically adjust said resonator means to transfer with precision the stability at said reference wavelength of the fundamental physical property to said laser optical cavity.

15. The method for providing an excimer laser source system emitting radiation characterized by a wavelength with a high degree of stability and by a narrow spectral bandwidth, and consiting of the following steps: (a) Providing in a first stage a reference frequency output beam from a frequency-stabilized reference laser system of a reference wavelength different from the wavelength of said excimer laer source system; (b) Providing in a second stage a resonator system stabilized by locking its cavity spacing tothe wavelength of said reference laser system by passing the output beam from said reference laser through the included resonator, measuring with a detector the power in the beam transmitted through said included resonator, and inputting the signal from said detector via a locking electronics system to drive a piezoelectric transducer so as to tune the included resonator in such a way that the power in the beam transmitted through said included resonator is maximized; and (c) Providing in a third stage an excimer laser oscillator, comprising an excimer laser gain medium, laser cavity mirrors and an intra-cavity resonator, and a feedback control means, the output beam from said excimer laser oscillator being spectrally narrowed and frequency-stabilized by transmitting it through the second-stage resonator of step (b), monitoring its intensity with said feedback control means, and adjusting said third-stage intra-cavity resonator with response from said feedback control means in such a way that the transmission of said excimer laser oscillator beam through said second stage resonator of step (b) is maximized.

16. The method for providing an excimer laser source system according to claim 15, wherein said feedback control means comprises a detector, a locking electronics system and a piezoelectric transducer, said detector monitoring the intensity of the beam transmitted through the second-stage resonator of step (b), and said locking electronics system receiving a signal from said detector and driving said piezoelectric transducer to optimally adjust said third-stage intra-cavity resonator of step (c) in such a way that the transmission of said excimer laser oscillator beam through said second-stage resonator of step (b) is maximized.

17. The method for providing an excimer laser source system according to claim 16, wherein said piezoelectric transducer is replaced by an electro-optic crystal placed within the cavity of said third-stage intra-cavity resonator of step (c), said locking electronics system controlling the refractive index of said electro-optic crystal to optimally adjust said third-stage intra-cavity resonator of step (c) in such a way that the transmission of said excimer laser oscillator beam through said second-stage resonator of step (b) is maximized.

18. The method for providing an excimer laser source system according to claim 15, wherein said feedback control means comprises two optical media, the first medium receiving as input the beam transmitted through the second-stage resonator of step (b) and producing an output beam of a different wavelength which controls the optical properties of said second medium, placed within the cavity of said third-stage intra-cavity resonator of step (c), to optimally adjust said third-stage intra-cavity resonator of step (c) in such a way that the transmission of said excimer laser oscillator beam through said second-stage resonator of step (b) is maximized.

19. The method for providing an excimer laser source system emitting radiation characterized by a wavelength with a high degree of stability and by a narrow spectral bandwidth, and consisting of the following steps:
(a) Providing an excimer laser gain medium;
(b) Providing an intra-cavity absorption cell containing vapor of a material with an absorption line overlapping with the wavelength of said excimer laser;
(c) Providing a laser optical cavity;
(d) Providing an intra-cavity resonator; and
(e) Providing feedback control means, the output beam from said excimer laser source system being frequency-stabilized and spectrally narrowed by monitoring its intensity with said feedback control means, and adjusting said intra-cavity resonator of step (d) and said laser optical cavity of step (c) with response from said feedback control means so as to maximize the intensity of said output beam.

20. The method for providing an excimer laser source system according to claim 19, wherein said feedback control means comprises a detector, a locking electronics system and two piezoelectric transducers, said detector monitoring the intensity of the output beam of said excimer laser source system and said locking electronics system receiving a signal from said detector and driving said piezoelectric transducers to optimally adjust said intra-cavity resonator of step (d) and said laser optical cavity of step (c) so as to maximize the output power of said excimer laser source system.

21. The method for providing an excimer laser source system according to claim 20, wherein said piezoelectric transducers are replaced by electro-optic crystals placed within the cavity of said resonator of step (d) and within said laser optical cavity of step (c), said locking electronics system controlling the refractive indices of said electro-optic crystals to optimally adjust said resonator of step (d) and said laser optical cavity of step (c) so as to maximize the output power of said excimer laser source system.

22. The method for providing an excimer laser source system according to claim 19, wherein said feedback control means comprises three optical media, the first medium receiving as input a part of the output beam of said excimer laser source system and producing an optical signal of a different wavelength which controls the optical properties of said second and third media, placed within the cavity of said resonator of step (d) and within said laser optical cavity of step (c), to optimally adjust said resonator of step (d) and said laser optical cavity of step (c) so as to maximize the output power of said excimer laser source system.

* * * * *